(12) United States Patent
Archambeau et al.

(10) Patent No.: US 7,128,278 B2
(45) Date of Patent: Oct. 31, 2006

(54) SYSTEM AND METHOD FOR IRRITATING WITH AERATED WATER

(75) Inventors: Greg Archambeau, Dallas, TX (US); Richard Klena, Dallas, TX (US); Anthony Wood, Dallas, TX (US)

(73) Assignee: Microdiffusion, Inc., Dallas, TX (US)

( * ) Notice: Subject to any disclaimer, the term of this patent is extended or adjusted under 35 U.S.C. 154(b) by 0 days.

(21) Appl. No.: 10/424,224

(22) Filed: Apr. 25, 2003

(65) Prior Publication Data
US 2004/0089746 A1    May 13, 2004

Related U.S. Application Data

(63) Continuation-in-part of application No. 10/213,499, filed on Aug. 6, 2002, now Pat. No. 6,702,949, which is a continuation-in-part of application No. 10/123,004, filed on Apr. 15, 2002, which is a continuation of application No. 08/957,530, filed on Oct. 24, 1997, now Pat. No. 6,386,751.

(60) Provisional application No. 60/310,904, filed on Aug. 8, 2001, provisional application No. 60/375,876, filed on Apr. 26, 2002, provisional application No. 60/310,543, filed on Aug. 7, 2001.

(51) Int. Cl.
| B05B 7/04 | (2006.01) |
| A01G 31/00 | (2006.01) |
| B01F 3/04 | (2006.01) |
| B01F 3/00 | (2006.01) |
| A01G 29/00 | (2006.01) |

(52) U.S. Cl. .......................... 239/8; 239/143; 239/142; 239/398; 47/48.5; 47/62 R; 261/87

(58) Field of Classification Search ................... 239/8, 239/143, 398–434.5, 461–524, 9, 142; 47/48.5, 47/62 R; 261/87, 122.1, 124; 405/44, 45, 405/51
See application file for complete search history.

(56) References Cited

U.S. PATENT DOCUMENTS

| 1,650,561 | A | | 11/1927 | Deniston |
| 3,333,771 | A | | 8/1967 | Graham |
| 3,791,349 | A | | 2/1974 | Schaefer |
| 4,004,553 | A | | 1/1977 | Stenstrom |
| 4,057,933 | A | * | 11/1977 | Enyeart .................... 47/79 |
| 4,143,639 | A | | 3/1979 | Frenette |
| 4,424,797 | A | | 1/1984 | Perkins |
| 4,619,072 | A | * | 10/1986 | Privett ................... 47/59 R |
| 5,188,090 | A | | 2/1993 | Griggs |
| 5,419,306 | A | | 5/1995 | Huffman |
| 5,674,312 | A | * | 10/1997 | Mazzei .................... 95/261 |
| 5,887,383 | A | * | 3/1999 | Soeda ................... 47/59 R |
| 5,948,326 | A | * | 9/1999 | Pate ...................... 261/91 |
| 6,173,526 | B1 | * | 1/2001 | Mazzei .................. 47/48.5 |
| 6,382,601 | B1 | * | 5/2002 | Ohnari ................. 261/79.2 |
| 6,386,751 | B1 | * | 5/2002 | Wootan et al. ........... 366/170.3 |
| 6,499,671 | B1 | * | 12/2002 | Sands et al. ............. 239/172 |
| 6,576,130 | B1 | * | 6/2003 | Wallace .................. 210/605 |
| 6,627,784 | B1 | * | 9/2003 | Hudson et al. ............ 588/320 |

* cited by examiner

*Primary Examiner*—David A. Scherbel
*Assistant Examiner*—Darren Gorman
(74) *Attorney, Agent, or Firm*—Howison & Arnott, L.L.P.

(57) ABSTRACT

An irrigation system for supplying aerated water to plants includes a diffuser. Oxygen is diffused into water by the diffuser to generate aerated water. The aerated water is supplied to an irrigation device which supplies the aerated water to the plants.

23 Claims, 9 Drawing Sheets

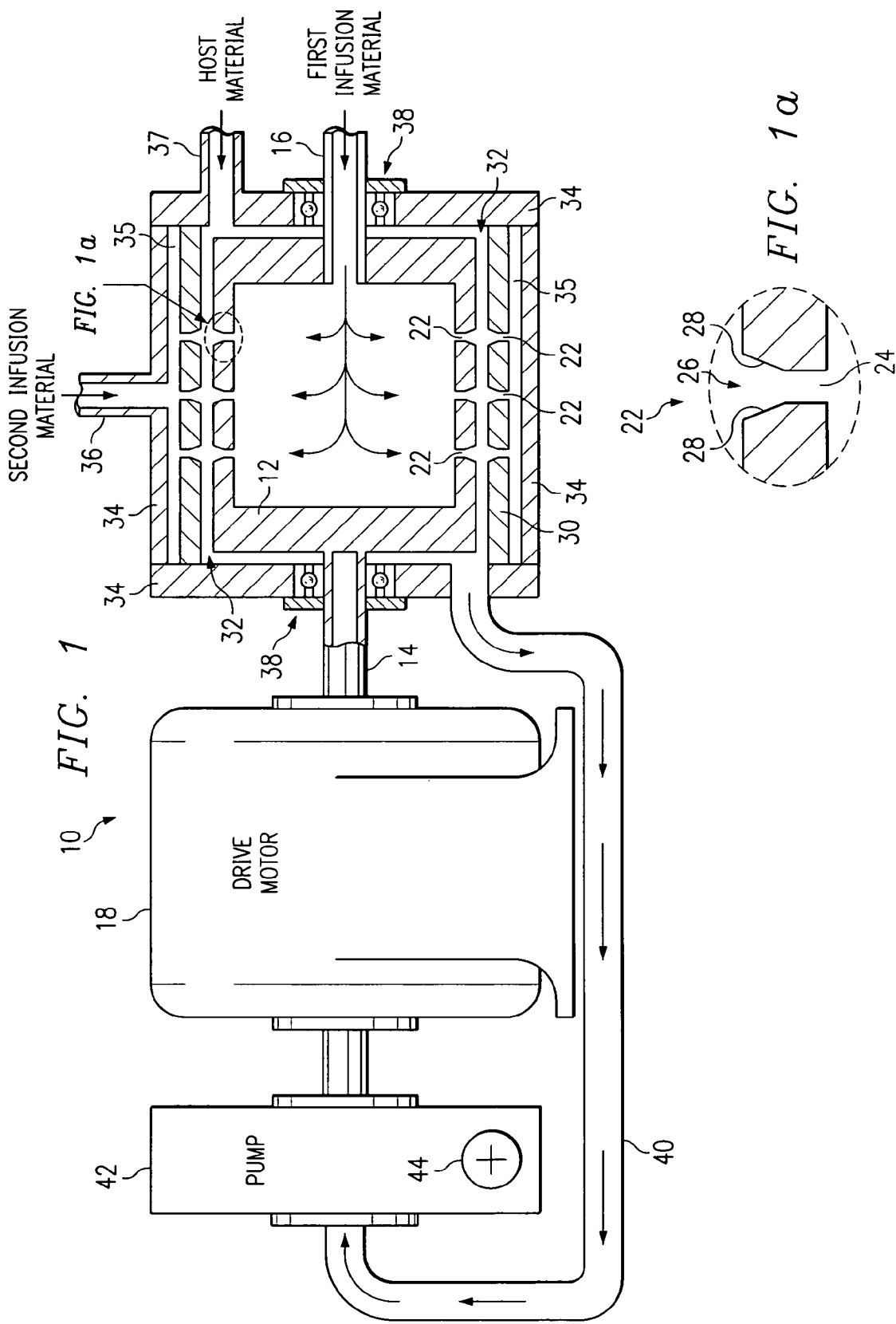

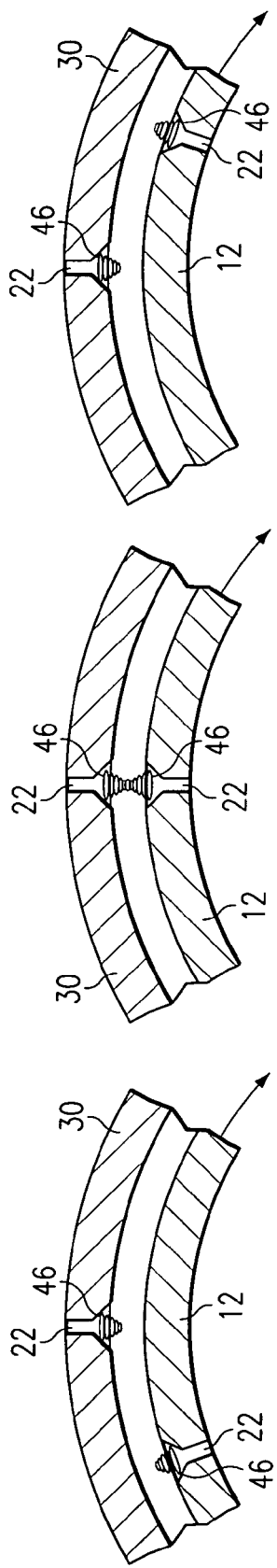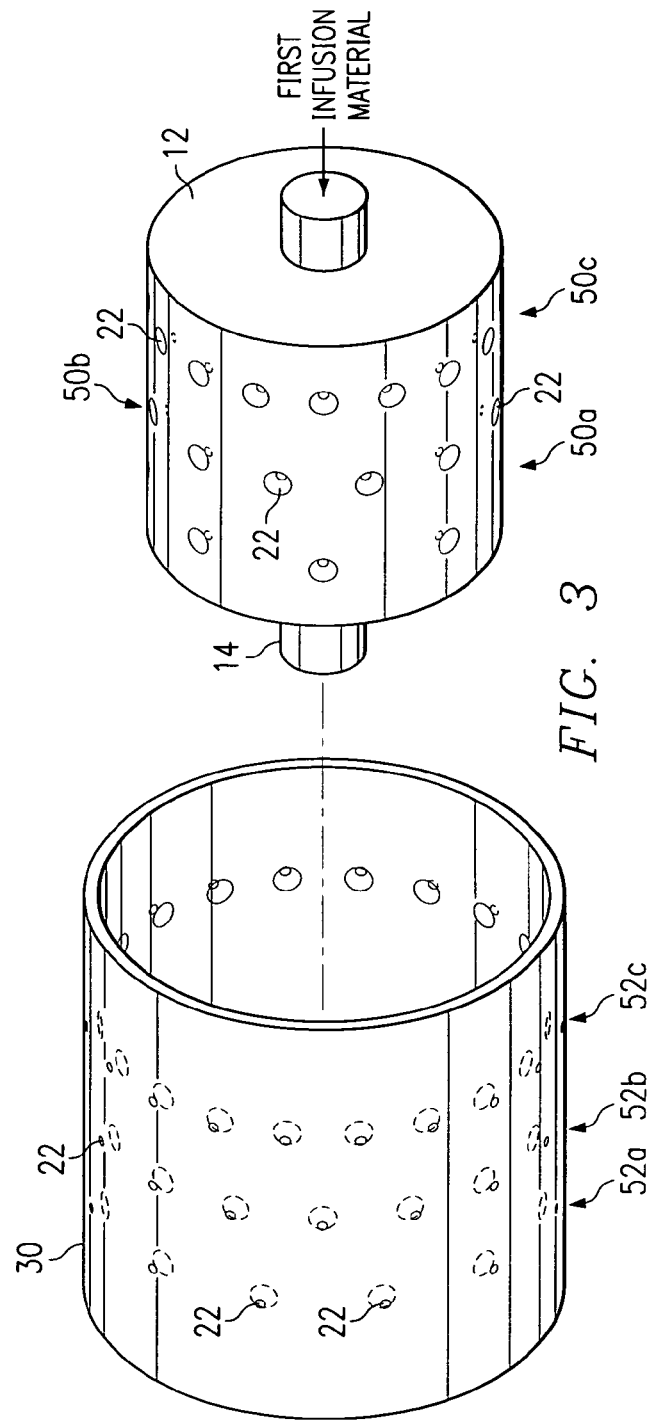

SYSTEM AND METHOD FOR IRRITATING WITH AERATED WATER

CROSS-REFERENCE TO RELATED APPLICATIONS

This application claims priority on provisional application 60/375,876 titled "System and Method for Irrigating with Aerated Water," filed on Apr. 26, 2002. This application is a continuation-in-part of U.S. patent application Ser. No. 10/213,499, titled "Diffuser/Emulsifier for Use in Aquaculture Applications," filed Aug. 6, 2002, now U.S. Pat. No. 6,702,949 which is a Continuation-in-Part of pending U.S. patent application Ser. No. 10/123,004 entitled "DIFFUSER/EMULSIFIER," filed on Apr. 15, 2002, which is a Continuation of U.S. Ser. No. 08/957,530 filed on Oct. 24, 1997 now U.S. Pat. No. 6,386,751 entitled "DIFFUSER/EMULSIFIER," and claims priority to Provisional Application No. 60/310,904 filed on Aug. 8, 2001, entitled "A SPARGER/AERATOR FOR AQUACULTURE," and also claims priority to Provisional Application No. 60/310,543 filed on Aug. 7, 2001, entitled "APPARATUS FOR ODOR CONTROL OF A LIFT STATION".

BACKGROUND OF THE INVENTION

1. Technical Field

This invention relates in general to irrigation systems, particularly to systems for supplying aerated water to the roots of plants.

2. Description of the Related Art

Green plants require oxygen for normal growth and development. Roots, in particular, require oxygen for aerobic respiration which they obtain directly from the growing media. The absorption of salts and root extension are dependent upon the energy supplied from respiration. Poorly aerated growing medias result in a decrease in water absorption due to a reduction in the permeability of the root cells. After extended periods of poor root aeration the roots stop growing and are more susceptible to disease.

As well, seeds require oxygen to germinate. Seed germination is inhibited by a lack of oxygen for prolonged periods. Often thick or oily seed coats must be removed from the seed so oxygen will be available to the embryo. Compacted or water logged soils or growing media can also create an oxygen-less environment and seeds will not germinate.

One method of providing oxygen to the roots of plants is the use of water with raised levels of oxygen dissolved into the water. This oxygen rich water is called oxygenated or aerated water.

In many applications, it is necessary to diffuse or emulsify one material—gas or liquid—within a second material. Emulsification is a subset of the process of diffusion wherein small globules of one liquid are suspended in a second liquid with which the first will not mix, such as oil into vinegar. One important application of the diffusion process is in wastewater treatment. Many municipalities aerate their wastewater as part of the treatment process in order to stimulate biological degradation of organic matter. The rate of biological digestion of organic matter is very dependent upon the amount of oxygen in the wastewater, since the oxygen is necessary to sustain the life of the microorganisms which consume the organic matter. Additionally, oxygen is able to remove some compounds, such as iron, magnesium and carbon dioxide.

There are several methods of oxygenating water. First, turbine aeration systems release air near the rotating blades of an impeller which mixes the air or oxygen with the water. Second, water can be sprayed into the air to increase its oxygen content. Third, a system produced by AQUATEX injects air or oxygen into the water and subjects the water/gas to a large scale vortex. Tests on the AQUATEX device have shown an improvement to 200% dissolved oxygen (approximately 20 ppm (parts per million)) under ideal conditions Naturally occurring levels of oxygen in water are approximately 10 ppm maximum, which is considered to be a level of 100% dissolved oxygen. Thus, the AQUATEX device doubles the oxygen content of the water. The increased oxygenation levels last only minutes prior to reverting back to 100% dissolved oxygen levels.

Greater oxygenation levels, and longer persistence of the increased oxygen levels, could provide significant benefits in treating wastewater. Importantly, the efficiency of the organic digestion would be increased and the amount of time need for biological remediation would decrease, improving on the capacity of wastewater treatment facilities.

Advantages are also derived from supplying water with greater oxygenation levels and longer persistence of the increased oxygen levels to plants.

Accordingly, a need has arisen for a diffusing mechanism capable of diffusing high levels of one or more materials into another material.

BRIEF SUMMARY OF THE INVENTION

In the present invention, an irrigation system for supplying aerated water to plants comprises, a diffuser, an oxygen supply for supplying oxygen to said diffuser, a water inlet for supplying water to said diffuser, and a water outlet for supplying aerated water from said diffuser to an irrigation device.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIGS. 1 and 1a illustrate a partially cross sectional, partially block diagram of a first embodiment of a diffuser;

FIGS. 2a, 2b and 2c illustrate the diffusion process internal to the diffuser;

FIG. 3 illustrates an exploded view of the rotor and stator of the diffuser;

DETAILED DESCRIPTION OF THE INVENTION

The present invention is best understood in relation to FIGS. 1–8 of the drawings, like numerals being used for like elements of the various drawings.

FIGS. 1 and 1a illustrate a partially block diagram, partially cross-sectional view first embodiment of a device 10 capable of diffusing or emulsifying one or two gaseous or liquid materials (hereinafter the "infusion materials") into another gaseous or liquid material (hereinafter the "host material"). The host material may be a normally solid material which is heated or otherwise processed to be in a liquid or gaseous state during the diffusion/emulsification process.

Figure 4:
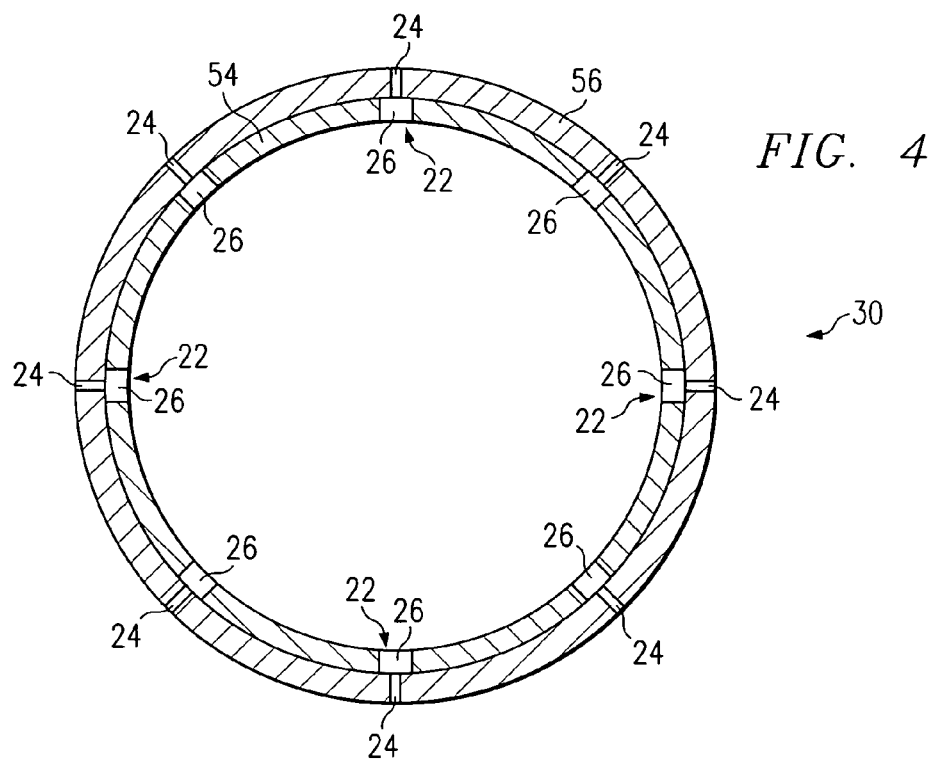
FIG. 4 illustrates an embodiment of the stator.

A rotor 12 comprises a hollow cylinder, generally closed at both ends. Shaft 14 and inlet 16 are coupled to the ends of the rotor 12. A first infusion material can pass through inlet 16 into the interior of rotor 12. Shaft 14 is coupled to a motor 18, which rotates the rotor at a desired speed. The rotor 12 has a plurality of openings 22 formed therethrough, shown in greater detail in FIG. 1a. In the preferred embodiment, the openings 22 each have a narrow orifice 24 and a larger borehole 26. The sidewalls 28 of the boreholes 26 can assume various shapes including straight (as shown in FIG. 4), angled (as shown in FIG. 1) or curved.

A stator 30 encompasses the rotor 12, leaving a channel 32 between the rotor and the stator through which the host material may flow. The stator 30 also has openings 22 formed about its circumference. A housing 34 surrounds the stator 30 and inlet 36 passes a second infusion material to an area 35 between the stator 30 and the housing 34. The host material passes through inlet 37 into the channel 32. Seals 38 are formed between the shafts 14 and 16 and the housing 34. An outlet 40 passes the host material from the channel 32 to a pump 42, where it exits via pump outlet 44. The pump may also be driven by motor 18 or by an auxiliary source.

In operation, the diffusion device receives the host material through inlet 37. In the preferred embodiment, pump 42 draws the host material on the pump's suction side in order to allow the host material to pass through the channel at low pressures. The first and second infusion materials are introduced to the host material through openings 22. The infusion materials may be pressurized at their source to prevent the host material from passing through openings 22.

The embodiment shown in FIG. 1 has separate inlets for 16 and 36 for the diffusion materials. This arrangement allows two different infusion materials to be introduced to the host material. Alternatively, a single infusion material could be introduced into both inlets.

In tests, the embodiment shown in FIG. 1 has demonstrated high levels of diffusion of the infusion material(s) into the host material. Tests using oxygen as the infusion material and water as the host material have resulted in levels of 400% dissolved oxygen in the water, with the increased oxygen levels lasting for days.

The reason for the high efficiency and persistence of the diffusion is believed to be the result of micro-cavitation, which is described in connection with FIGS. 2a–c. Whenever a material flows over a smooth surface, a rather laminar flow is established with a thin boundary layer that is stationary or moving very slowly because of the surface tension between the moving fluid and the stationary surface. The openings 22, however, disrupt the laminar flow and can cause compression and decompression of the material. If the pressure during the decompression cycle is low enough, voids (cavitation bubbles) will form in the material. The cavitation bubbles generate a rotary flow pattern 46, like a tornado, because the localized area of low pressure draws the host material and the infusion material, as shown in FIG. 2a. When the cavitation bubbles implode, extremely high pressures result. As two aligned openings pass one another, a succussion (shock wave) occurs, generating significant energy. The energy associated with cavitation and succussion mixes the infusion material and the host material to an extremely high degree, perhaps at the molecular level.

The tangential velocity of the rotor 12 and the number of openings that pass each other per rotation dictate the frequency at which the device operates. It has been found that operation in the ultrasonic frequency can be beneficial in many applications. It is believed that operating the device in the ultrasonic region of frequencies provides the maximum succussion shock energy to shift the bonding angle of the fluid molecule, which enables it to transport additional infusion materials which it would not normally be able to retain. The frequency at which the diffuser operates appears to affect the degree of diffusion, leading to much longer persistence of the infusion material in the host material.

In some applications, a particular frequency or frequencies may be desired to break down certain complex molecules, such as in the case of water purification. In this application, multiple frequencies of succussion can be used to break complex structures, such as VOCs (volatile organic compounds), into smaller sub-structures. Ozone can be used as one of the infusion materials to oxidize the sub-structures at a high efficiency.

Other sonochemistry applications can be performed with the device 10. In general, sonochemistry uses ultrasound to assist chemical reactions. Typically, the ultrasound is generated using a piezoelectric or other electro-acoustical device. A problem associated with electro-acoustical transducers is that the sound waves do not provide uniform sound waves throughout the material; rather, the desired cavitation is localized around the device itself. The present invention allows the ultrasonic waves to be produced throughout a material using a simple mechanical device.

FIG. 3 illustrates an exploded view of an embodiment of the rotor 12 and stator 30 where multiple frequencies may be obtained at a single rotational velocity. In FIG. 3, three circular arrays of openings 50 (shown individually as arrays 50*a*, 50*b*, and 50*c*) of openings 22 are disposed circumferentially about the rotor 12. Each ring has a different number of openings evenly spaced about its circumference. In similar fashion, the stator 30 would have three circular arrays of openings 52 (shown individually as arrays 52*a*, 52*b*, and 52*c*). To ensure that only one pair of openings between corresponding arrays will be coincident at any one time, the number of openings 22 in a given array 52 on the stator 30 can be one more (or less) than the number of openings 22 in the corresponding array 50 of the rotor 12. Thus, for example, if array 50*a* had twenty openings evenly spaced around the circumference of rotor 12, array 52 could have 21 openings spaced evenly around the circumference of stator 30.

As the rotor 12 of FIG. 3 rotates relative to stator 30, each array will create succussions at a different frequency. By properly choosing different frequencies, a sum and difference interference pattern will result, creating a wide spectrum of frequencies. This spectrum of frequencies can be beneficial in many applications where unknown impurities in a host liquid need to be broken down and oxidized.

FIG. 4 illustrates a cross-sectional side view of an embodiment of a stator 30. For smaller diameter stators, it may be difficult to form the borehole 26 on the inside of stator 30. The embodiment of FIG. 4 uses an inner sleeve 54 and an outer sleeve 56. The boreholes 26 can be drilled, from the outside, of the inner sleeve 54. For each borehole 26 on the inner sleeve 54, a corresponding aligned orifice 24 is drilled on the outer sleeve 56. The inner sleeve 54 is then placed in, and secured to, the outer sleeve 56 to form the stator 30. Other methods, such as casting, could also be used to form the stator 30.

Figure 5A:
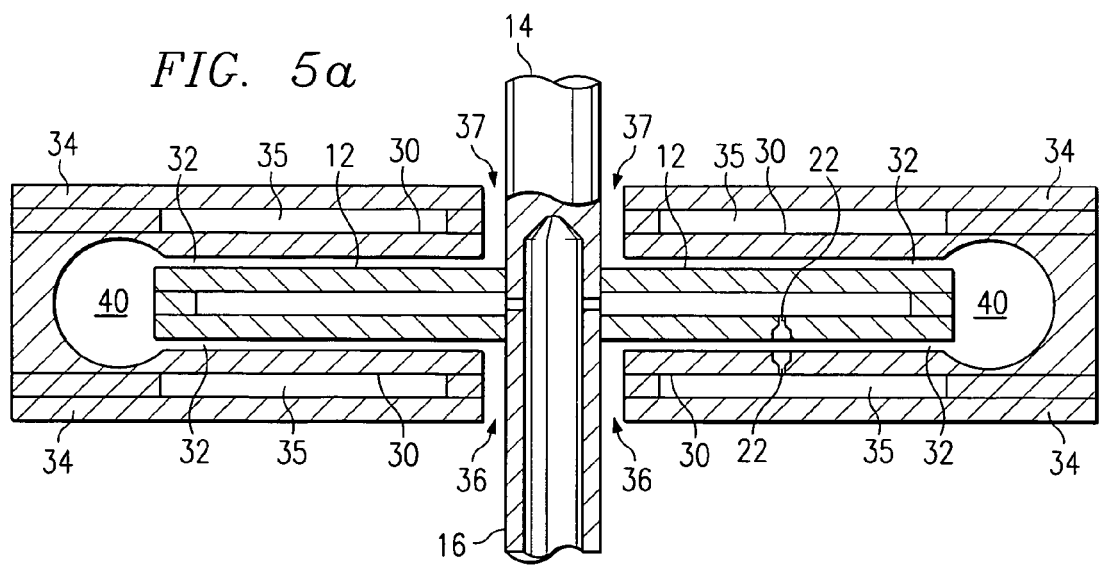
FIG. 5a illustrates a cross-section view of the rotor-stator assembly in a second embodiment of the invention.
Figure 5B:
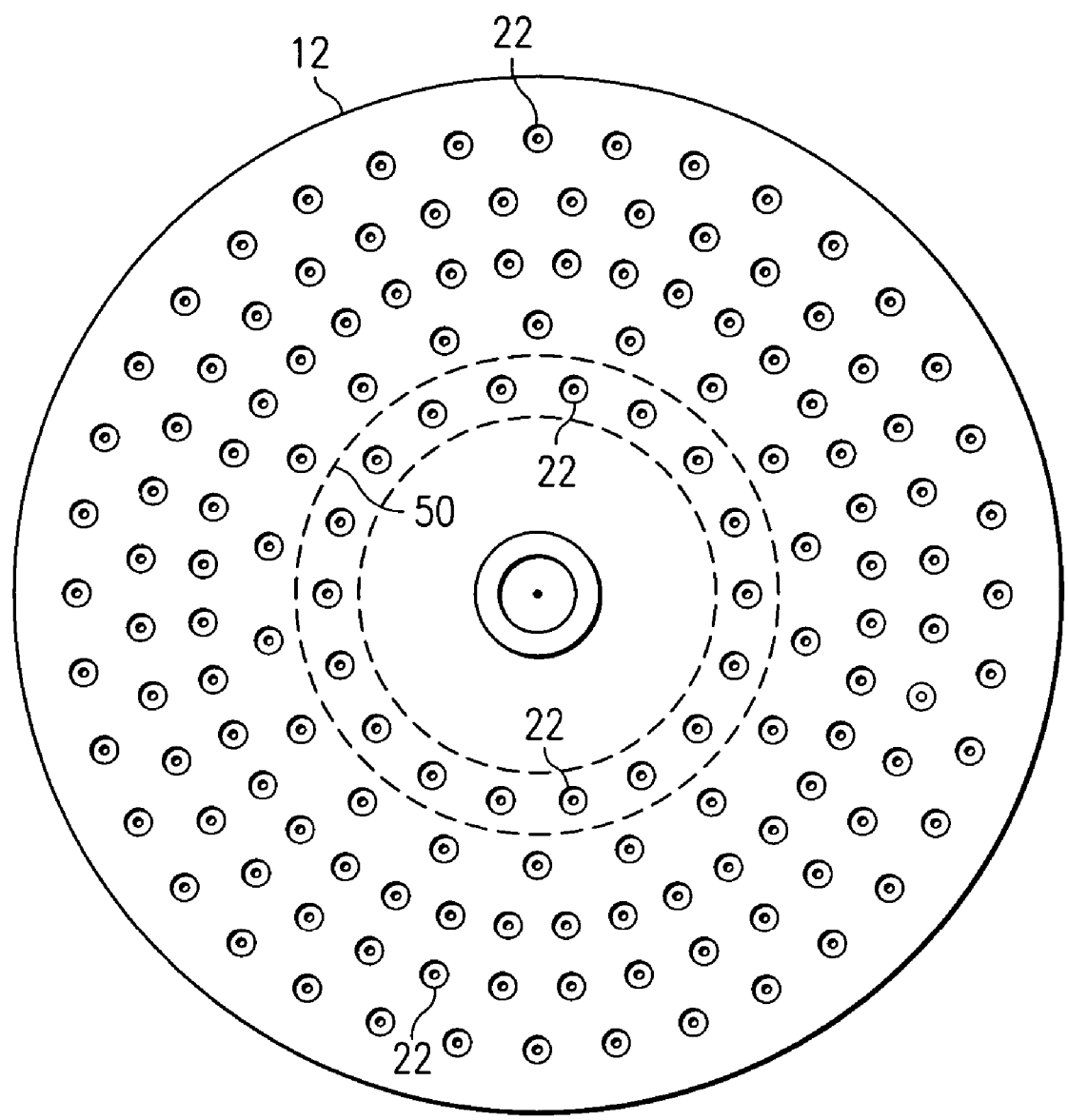
FIG. 5b illustrates a top view of the rotor in the second embodiment of the invention.
Figure 6:
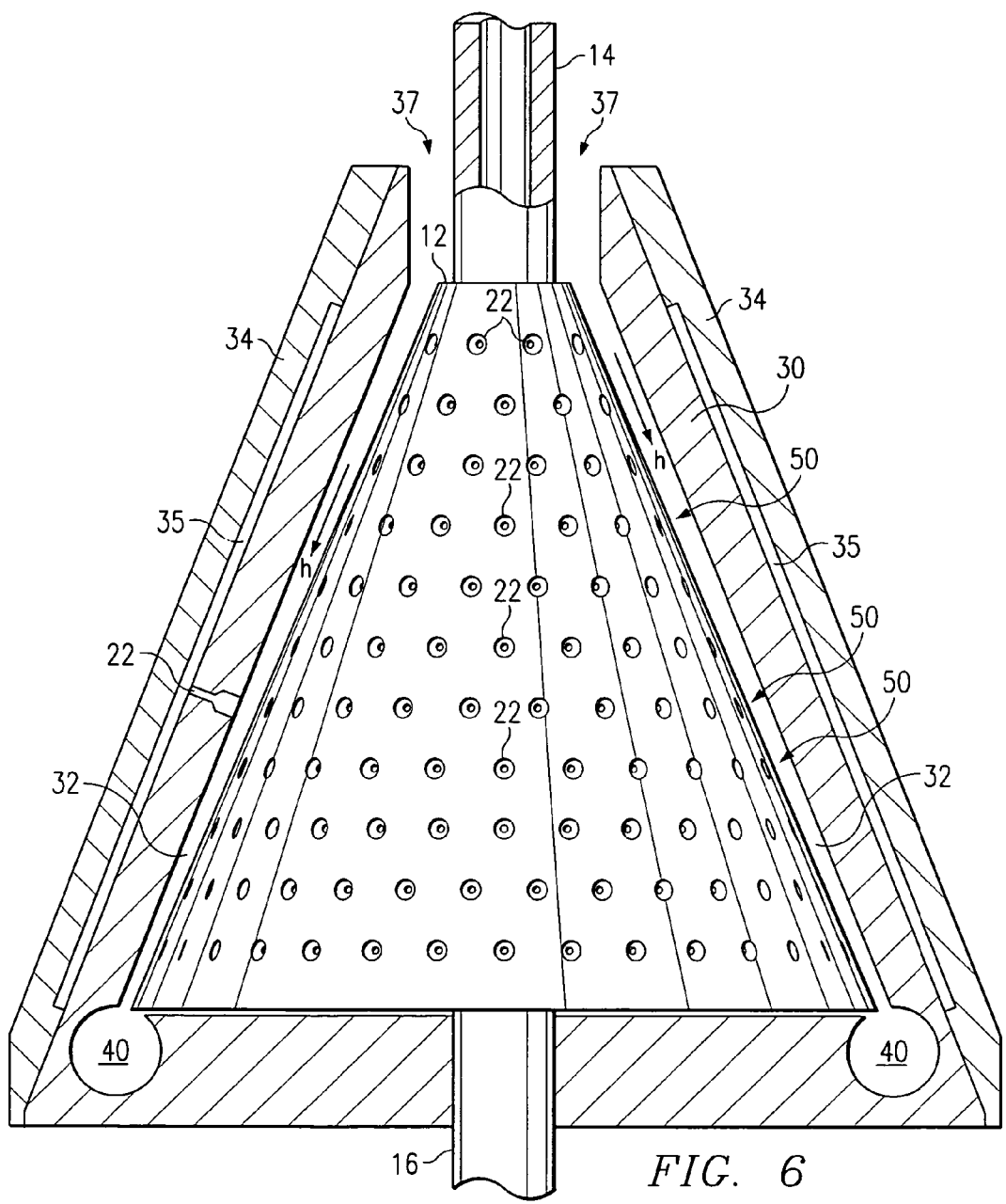
FIG. 6 illustrates a cut-away view of a third embodiment of the invention.

FIGS. 5a–b and 6 illustrate alternative embodiments of the diffuser 10. Where appropriate, reference numerals from FIG. 1 are repeated in these figures.

FIG. 5a illustrates an cross-sectional side view of an embodiment where the rotor 12 and stator 30 are disk shaped. FIG. 5b illustrates a top view of the disk shaped rotor 12. The stator 30 is formed above and below the rotor 12. Both the stator 12 and rotor 30 have a plurality of openings of the type described in connection with FIG. 1, which pass by each other as the rotor 12 is driven by the motor. As before, for each array 52, the stator 30 may have one opening more or less than the corresponding array 50 in rotor 12 in order to prevent simultaneous succussion at two openings within an array. The openings 22 can be of the same shape as shown in FIG. 1. A hollow shaft serves as the inlet 16 to the interior of the disk shaped rotor for the first infusion material. Similarly, an area 35 between the stator 30 and the housing 34 receives the second infusion material. As the host material flows in the channel 32 between the rotor 12 and the stator 30, it is subjected to the vortex generation at the openings 22, thereby causing a diffusion of the first and second materials with the host material. The infused host material passes to outlets 40.

FIG. 5b illustrates a top view of the rotor 12. As can be seen, a plurality of openings forms concentric arrays of openings on the rotor 12. Each array can, if desired, generate succussions at different frequencies. In the preferred embodiment, openings 22 would be formed on the top and bottom of the rotor 12. Corresponding openings would be formed above and below these openings on the stator 30.

FIG. 6 illustrates a cut away view of an embodiment of the invention where the rotor 12 has a conical shape. Both the stator 12 and rotor 30 have a plurality of openings of the type described in connection with FIG. 1, which pass by each other as the rotor 12 is driven by the motor. In addition to the openings around the circumference of the rotor 12, there could also be openings at the bottom of the conical shape, with corresponding openings in the portion of the stator 30 at the bottom. As before, for each array, the stator 30 may have one opening more or less than the rotor 12 in order to prevent simultaneous succussion at two openings 22 on the same array. A hollow shaft serves as the inlet 16 to the interior of the disk shaped rotor for the first infusion material. Similarly, an area 35 between the stator 30 and the housing 34 receives the second infusion material. As the host material flows between the rotor 12 and the stator 30, it is subjected to the vortex generation at the openings 22, thereby causing a diffusion of the first and second materials with the host material. The infused host material passes to outlets 40.

In the embodiments of FIGS. 5a–b and 6, because the arrays of openings 22 can be formed at increasing diameters, generation of multiple frequencies may be facilitated. It should be noted that any number of shapes could be used, including hemi-spherical and spherical shapes to realize the rotor 12 and stator 30.

The diffuser described herein can be used in a number of applications. Optimal opening size (for both the orifice 24 and borehole 26), width of channel 32, rotational speed and rotor/stator diameters may be dependent upon the application of the device.

As described above, the diffuser 10 may be used for water aeration. In this embodiment air or oxygen is used as both the first and second infusion materials. The air/oxygen is diffused into the wastewater (or other water needing aeration) as described in connection with FIG. 1. It has been found that the diffuser can increase the oxygenation to approximately 400% dissolved oxygen, with greater concentrations expected as parameters are optimized for this application. In tests which circulated approximately twenty five gallons of municipal water at ambient temperatures (initially having a reading of 84.4% dissolved oxygen) through the device for five minutes to achieve 390% dissolved oxygen content, the enhanced concentration of oxygen levels remained above 300% dissolved oxygen for a period of four hours and above 200% dissolved oxygen for over 19 hours. After three days, the dissolved oxygen content remained above 134%. In these tests, frequencies of 169 kHz were used. The sizes of the openings were 0.030 inches for the orifice 24 and 0.25 inches for the borehole (with the boreholes 26 on the rotor having sloped sides). Cooler temperatures could significantly increase the oxygenation levels and the persistence.

Also for the treatment of wastewater, or for bio-remediation of other toxic materials, oxygen could be used as one of the infusion materials and ozone could be used as the other infusion material. In this case, the ozone would be used to oxidize hazardous structures in the host material, such as VOCs and dangerous microorganism. Further, as described above, a set of frequencies (as determined by the arrays of openings in the rotor 12 and stator 30) could be used to provide an destructive interference pattern which would break down many of the complex structures into smaller substructures. Alternatively, if the treatment was directed towards oxidation of a single known hazardous substance, it would be possible to use a single frequency which was known to successfully break down the structure. Conversely, a set of frequencies which result in a constructive interference pattern could be used to combine two or more compounds into a more complex and highly structured substance.

For producing potable water, ozone could be used as the first and second infusion material to break down and oxidize contaminants.

While the operation of the diffuser 10 has been discussed in connection with large applications, such as municipal wastewater remediation, it could also be used in household applications, such as drinking water purifiers, swimming pools and aquariums.

The diffuser could also be used for other applications where diffusion of a gas or liquid into another liquid changes the characteristics of the host material. Examples of such applications would include the homogenization of milk or the hydrogenation of oils. Other applications could include higher efficiencies in mixing fuel and gases/liquids resulting in higher fuel economy.

Figure 7A:
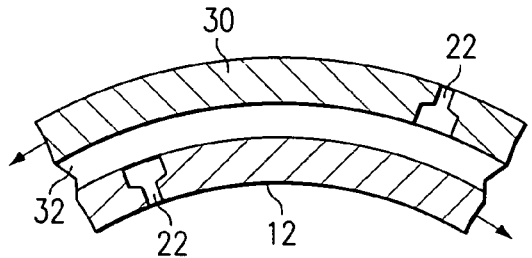
FIGS. 7a through 7h illustrate alternative embodiments for generating the diffusion.
Figure 7B:
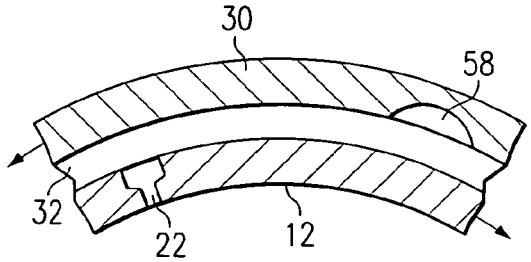

FIGS. 7a–b illustrate alternative embodiments for the rotor 12 and stator 30. In FIG. 7a, the stator 30 also rotates; in this case, the frequency of the successions will be dependent upon the relative rotational speed between the rotor 12 and stator 30. In FIG. 7b, one of either the rotor 12 or stator 30 does not pass an infusion material through the component (in FIG. 7b only the rotor passes an infusion material); the component which does not pass an infusion material has its openings 22 replaced by cavities 58 to produce the turbulence. The cavities 58 could be shaped similarly to the boreholes 26 without the accompanying orifices 24.

Figure 7C:
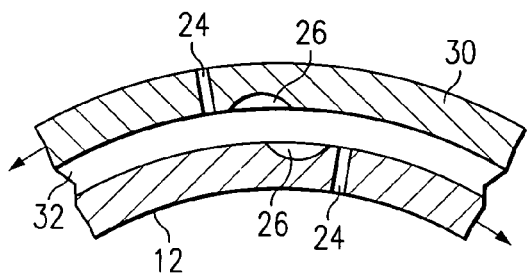

In FIG. 7c, the orifice 24 through which the infusion material is passed through the rotor 12 or stator 30 is positioned next to the borehole 26, rather than in the borehole 26 as in previous embodiments. It should be noted that a purpose of the borehole 26 is to disrupt the laminar flow of the host material along the surface of the rotor 12 and stator 30. The compression and rarefaction (decompression) of the host material causes the micro-cavitation, which provides the high degree of diffusion produced by the device. During decompression, voids (cavitation bubbles) are produced in the host material. The cavitation bubbles grow and contract (or implode) subject to the stresses induced by the frequencies of the successions. Implosions of cavitation bubbles produce the energy which contribute to the high degree of diffusion of the infusion materials into the host material as it passes through the channel 32. Thus, so long as the infusion materials and the host material are mixed at the point where the cavitation and resultant shock waves are occurring, the diffusion described above will result.

Figure 7E:
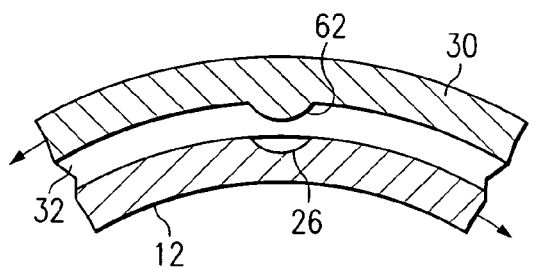
Figure 7D:
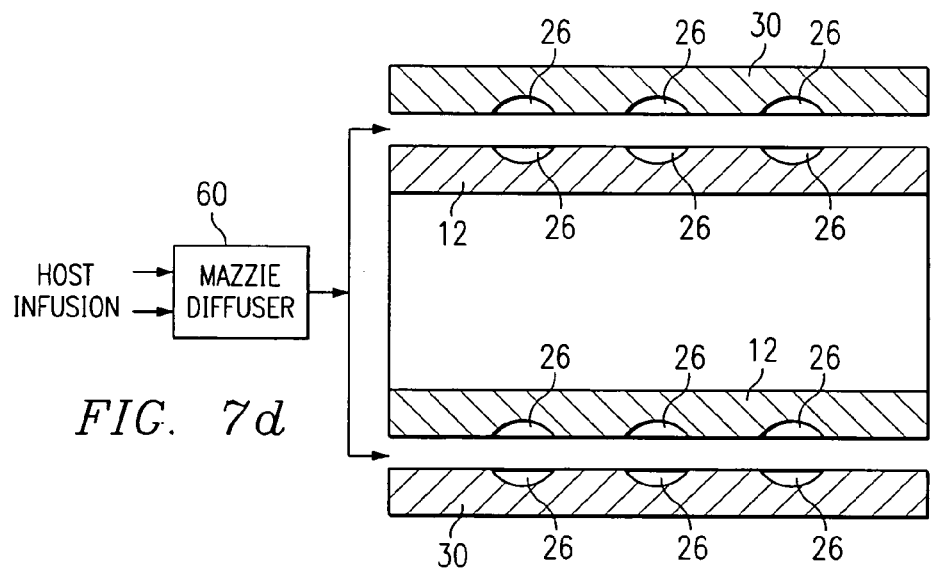

FIG. 7d illustrates an embodiment where the initial mixing of the host material and one or more infusion materials is performed outside of channel 32. In this embodiment a Mazzei diffuser 60 (or other device) is used to perform the initial mixing of the infusion material(s) and the host material. The mixture is input into the channel 32 between the rotor 12 and stator 30, wherein undergoes the compression/rarefaction cycles discussed above, which cause cavitation in the mixture, and is subjected to the frequency of the shock waves.

Figure 7F:
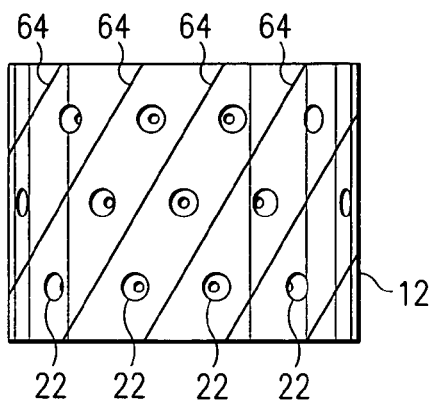

Further, the generation of the cavitation and shock waves could be performed using structures which differ from the boreholes 26 shown in the embodiments above. As stated above, the boreholes 26 are surface disturbances which impede the laminar flow of the host material along the sidewalls of the channel 32. In FIG. 7e, a protrusion, such as bump 62 could be used as a surface disturbance in place of or in conjunction with the boreholes 26. Shapes other than rounded shapes could also be used. As shown in FIG. 7f, grooves (or ridges) 64 could be formed in the rotor 12 and/or stator 30 to generate the cavitation and shock waves.

Figure 7G:
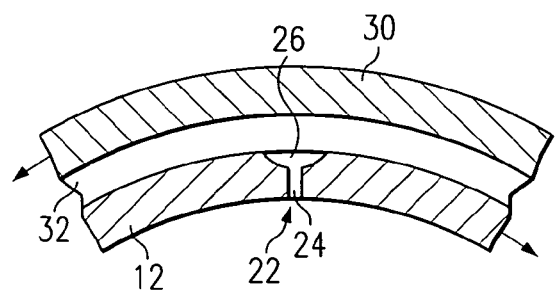

As stated above, not all applications require, or benefit from, the generation of shock waves at a particular frequency. Therefore, the rotor 12 or stator 30 could have the boreholes 26 (or other surface disturbances) arranged such that a white noise was produced, rather than a particular frequency. The structures used to create the cavitation need not be uniform; a sufficiently rough surface be formed on the rotor 12 or stator 30 will cause the cavitation. Additionally, as shown in FIG. 7g, it may not be necessary for both the surface of the rotor 12 and the surface of the stator 30 to create the cavitation; however, in most cases, operation of the device 10 will be more efficient if both surfaces are used.

Figure 7H:
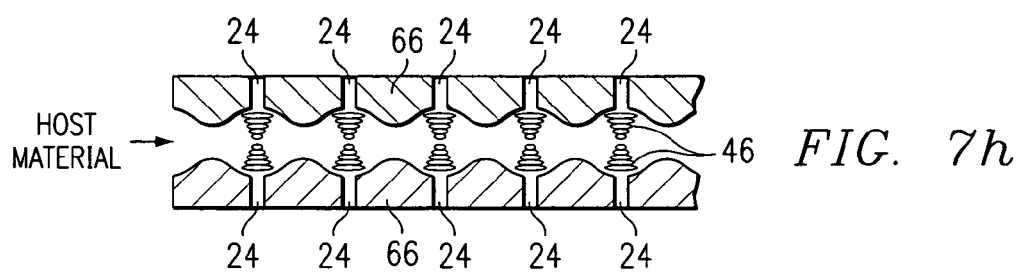

FIG. 7h illustrates a embodiment where the movement which causes the cavitation is provided by the host material (optionally with entrained infused material) rather than by relative motion of the rotor 12 and stator 30. In the embodiment of FIG. 7h, the channel 32 is formed between two walls 66 which are static relative to one another, one or both of which have surface disturbances facing the channel 32. The host material is driven through the channel at high speed using a pump or other device for creating a high speed flow. One or more infusion materials are input into the channel, either through orifices 24 or by mixing the host material with the infusion materials external to the channel. The high speed of the host material relative to the walls 66 causes the micro-cavitation and successions described above.

As an example, one or more of the walls 66 could be a fine mesh, through which the infusion material(s) flows to mix with the host material in the channel 32. The surface disturbances in the mesh would cause micro-cavitations and successions as the host material flows over the mesh at high speed. The frequency of the successions would depend upon the resolution of the mesh and the speed of the host material. Once again, the infusion materials would diffuse into the host material at the molecular level at the micro-cavitation sites.

Figure 8A:
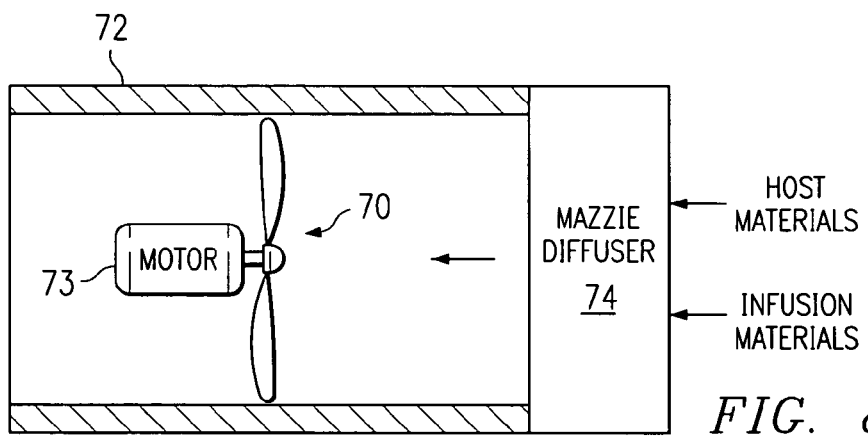
FIGS. 8a and 8b illustrate another alternative embodiment of the invention.
Figure 8B:
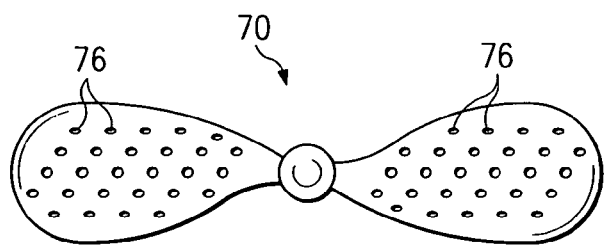

FIGS. 8a and 8b illustrate another embodiment, where a rotating member 70 is disposed within a conduit 72 and rotated by motor 73. The host material and infusion material (s) are mixed in the conduit 72 upstream from the rotating member 70 using a Mazzei diffuser 74 or other device. The rotating member could be, for example, propeller or auger shaped. On the surface of the rotating member 70 has one or more surface disturbances 76, such that the rotation of the rotating member 70 creates the micro cavitation discussed above, thereby causing a high degree of diffusion between the materials. The shape of the propeller blades and pattern of the surface disturbances 76 thereon could create the cavitation and succession at a desired frequency for purposes described above. Further, the shape of the rotating device could draw the materials through the conduit.

Figure 9:
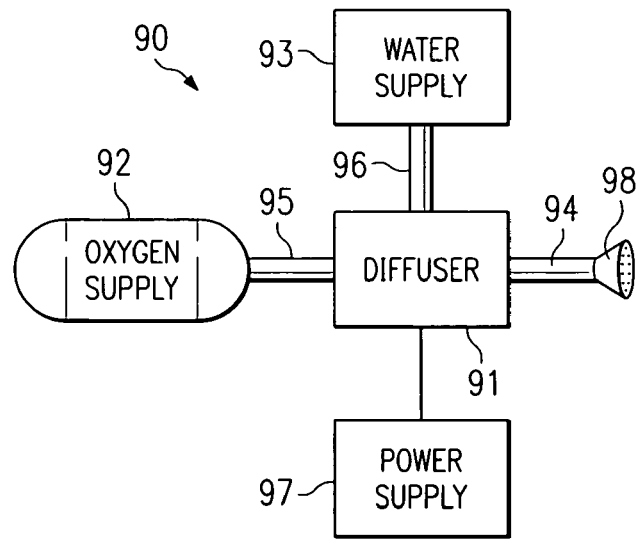
FIG. 9 illustrates a system for supplying aerated water to plants.

The present invention provides significant advantages over the prior art. First, the micro-cavitations generated by the device allow diffusion to occur at a molecular level, increasing the amount of infusion material which will be held by the host material and the persistence of the diffusion. Second, the micro-cavitations and shock waves can be produced by a relatively simple mechanical device. Third, the frequency or frequencies of the shock wave produced by the device can be used in many applications, either to break down complex structures or to aid in combining structures. Fourth, the cavitations and shock waves can be produced uniformly throughout a material for consistent diffusion FIG. 9 illustrates a system for supplying aerated water to plants 90 in accordance with one embodiment. A diffuser 91 is fed with water from a water supply 93 via a water inlet 96. The diffuser 91 may be of the type described herein, or may be any other type of system for diffusing a gas into a liquid. The diffuser 91 may be a bubble diffuser membrane. Either a fine or coarse bubble diffuser membrane may be used. The diffuser 91 may include a Mazzei injector or other types of venturi injectors. The diffuser 91 could bubble oxygen through a stone. The diffuser 91 could pass oxygen through a membrane into water on the other side of the membrane. It will be apparent to those skilled in the art that any type of system for diffusing oxygen into water could be used in the described plant irrigation system.

Oxygen from an oxygen supply 92 is fed into the diffuser 91 via an oxygen inlet 95. The oxygen supply 92 could be any known source of oxygen, including an air compressor, pressure swing absorption unit, a molecular sieve, a membrane or the like.

Other gases or combination of gases may be diffused in to the water, as suitable to the particular plant and desired results. In accordance with the preferred embodiment, pure oxygen is used.

The diffuser 91 diffused oxygen into the water in accordance with the principles described heretofore. Water containing diffused oxygen may be referred to as aerated water. The aerated water output by the diffuser is dispersed through a water outlet 94. The water outlet 94 feeds the water to an irrigation device 98. The irrigation device may take a wide variety of forms. The choice of irrigation devices would be made substantially in accordance with known principles of plant irrigation. Typically, the irrigation device 98 may be a surface irrigation device or a sub-surface irrigation system that provides the aerated water directly to the roots of the plants.

One aspect of the present invention is the ability of the irrigation system to provide in-the-pipe real-time water aeration. This system is capable of providing oxygen into streaming irrigation water.

A power supply 97 feeds power to the diffuser 91 and to the oxygen supply 92, as necessary. The power supply will be portable in accordance with the preferred embodiment of the invention. The power supply 97 could be a portable electric generator, such as one powered by a gasoline engine or a natural gas engine. In the alternative, the power supply 97 could be a conventional power-line power source, where such a power source is available. Some diffusers and oxygen sources may not require power to operate. The choice of power supply may depend on the requirements of the diffuser and oxygen supply as well as the portability requirements of the application.

The irrigation system 90 could be used to supply aerated water to any type of plant at substantially any location. In particular, the irrigation system would be particularly useful in supplying aerated water to a golf course, landscaping or crops.

Figure 10:
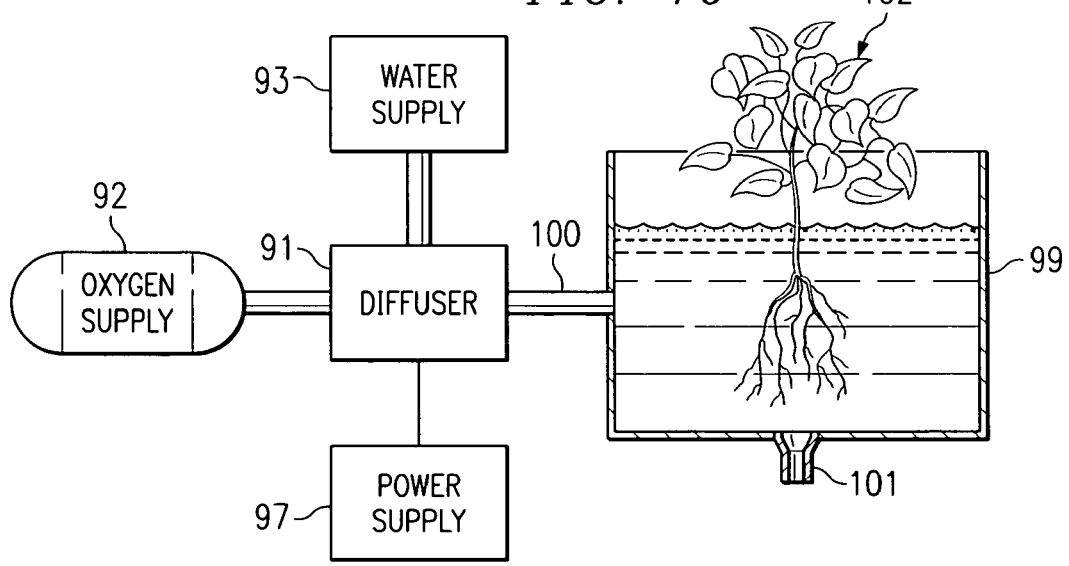
FIG. 10 illustrates an aerated hydroponic system.

FIG. 10 depicts an aerated hydroponic growing system in accordance with one embodiment. Diffuser 91 is supplied with oxygen 92 and water 93. The diffuser 91 may be supplied with electricity by power supply 97. Diffuser 91 creates aerated water and delivers the aerated water to hydroponic chamber 99 via pipe 100. Plants 100 are grown in a solution of aerated air and nutrients. The solution may be removed from the hydroponic chamber 99 via drain 101.

Figure 11:
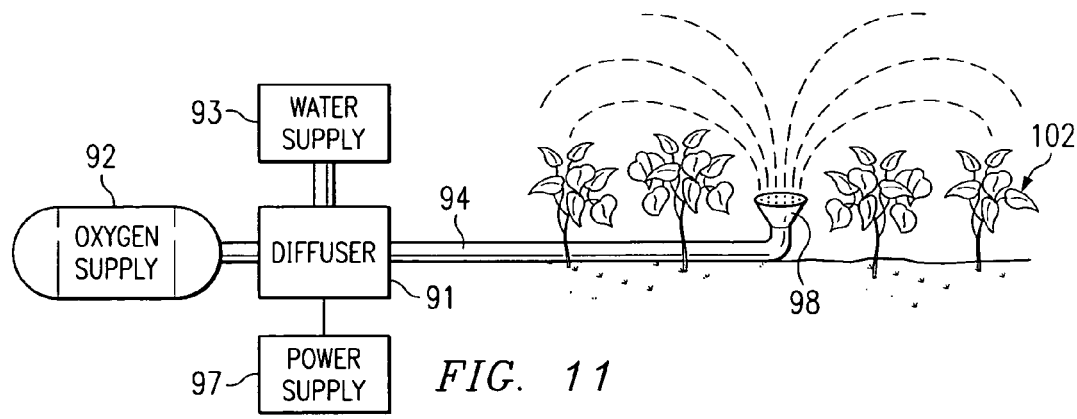
FIG. 11 illustrates a spray irrigation system.

FIG. 11 depicts a spray irrigation system in accordance with one embodiment. Diffuser 91 is supplied with oxygen 92 and water 93. The diffuser 91 may be supplied with electricity by power supply 97. Diffuser 91 creates aerated water and delivers the aerated water to spray water outlet 98 via pipe 94. The spray water outlet 98 delivers the aerated water to plants 102 by spraying the water over the ground where the plants 102 grow.

Figure 12:
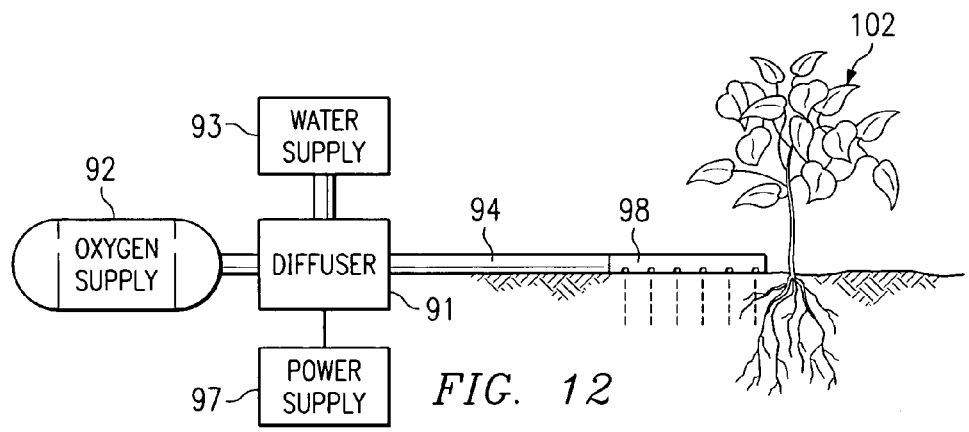
FIG. 12 illustrates a drip irrigation system.

FIG. 12 depicts a drip irrigation system in accordance with one embodiment. Diffuser 91 is supplied with oxygen 92 and water 93. The diffuser 91 may be supplied with electricity by power supply 97. Diffuser 91 creates aerated water and delivers the aerated water to drip water outlet 98 via pipe 94. The drip water outlet 98 delivers the aerated water to plants 102 by dripping the water onto the ground where the plants 102 grow.

Figure 13:
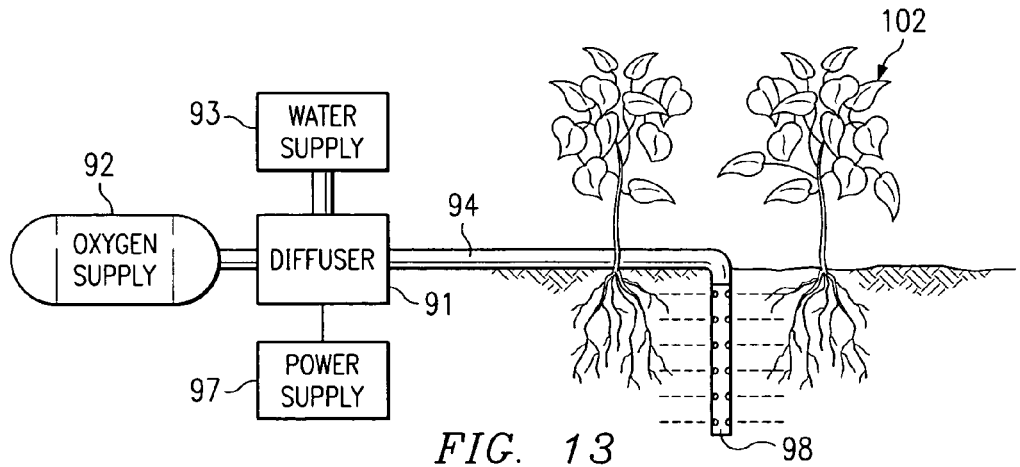
FIG. 13 illustrates an injection irrigation system.

FIG. 13 depicts an injection irrigation system in accordance with one embodiment. Diffuser 91 is supplied with oxygen 92 and water 93. The diffuser 91 may be supplied with electricity by power supply 97. Diffuser 91 creates aerated water and delivers the aerated water to injection water outlet 98 via pipe 94. The injection water outlet 98 delivers the aerated water to plants 102 by injecting the water into the ground where the plants 102 grow.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. An irrigation system for supplying aerated water to plants comprising:
    a diffuser for diffusing oxygen into continuously streaming water, said diffusion of oxygen caused by disturbances created by a flow of the continuously streaming water through said diffuser;
    an oxygen supply for supplying oxygen into said disturbances created by the flow of the continuously streaming water through said diffuser;
    a water inlet for supplying the continuously streaming water to said diffuser; and
    a water outlet for supplying aerated streaming water from said diffuser to an irrigation device.

2. The irrigation system of claim 1 wherein said diffuser further comprises a bubble diffuser membrane.

3. The irrigation system of claim 1 wherein said diffuser further comprises a venturi injector.

4. The irrigation system of claim 1 wherein said diffuser further comprises a stone wherein oxygen is bubbled through said stone.

5. The irrigation system of claim 2 wherein said oxygen is passed from a first side of the membrane through the membrane into water on a second side of the membrane.

6. The irrigation system of claim 1, further comprising a power source for supplying power to the diffuser.

7. The irrigation system of claim 6, wherein said power source is a portable generator.

8. The irrigation system of claim 1, wherein said oxygen supply is an air compressor.

9. The irrigation system of claim 1, wherein said oxygen supply is a pressure swing absorption unit.

10. The irrigation system of claim 1, wherein said oxygen supply comprises a molecular sieve.

11. The irrigation system of claim 1, wherein said oxygen supply comprises a membrane.

12. A method of supplying aerated water to plants comprising:
    continuously streaming a constant flow of non-aerated water between an input of a diffuser and an output of the diffuser, said continuously streaming flow through the diffuser generating disturbances in the non-aerated water;
    diffusing oxygen into the continuously streaming non-aerated water within the diffuser by supplying the oxygen into the disturbances formed by the flow of the continuously streaming flow through the diffuser to form aerated streaming water;
    supplying the aerated streaming water to an irrigation device; and
    irrigating plants with said aerated streaming water.

13. The method of claim 12, wherein said diffusing is performed using a rotating diffuser.

14. The method of claim 12, wherein said diffusing is performed using a bubble diffuser membrane.

15. The method of claim 12, wherein said diffusing is performed using a venturi injector.

16. The method of claim 12, wherein said diffusing comprises the step of bubbling oxygen through a stone.

17. The method of claim 12, wherein said diffusing comprises the step of passing oxygen through a membrane into water.

18. A irrigation system for providing oxygenated water comprising:
    a water supply;
    an oxygen supply;

a diffuser, including an inlet for receiving non-oxygenated water and an outlet for providing oxygenated water, for diffusing oxygen from said oxygen supply into continuously streaming water from said water supply to create the oxygenated streaming water, wherein a flow of said continuously streaming water through said diffuser creates disturbances within the continuously streaming water for diffusing the oxygen into the continuously streaming water to create the oxygenated water; and an irrigation device;

wherein said oxygenated water streams from said diffuser to said irrigation device.

19. The system of claim 18, wherein said oxygen supply is a pressure swing absorption unit.

20. The system of claim 18, wherein said diffuser comprises a venturi injector.

21. The irrigation system of claim 1, wherein said irrigation device is a hydroponic chamber.

22. The method of claim 12, wherein said irrigation device comprises a hydroponic chamber.

23. The irrigation system of claim 18, wherein said irrigation device comprises a hydroponic chamber.

\* \* \* \* \*